US010596877B2

(12) United States Patent
Danjyo et al.

(10) Patent No.: US 10,596,877 B2
(45) Date of Patent: Mar. 24, 2020

(54) AIR CONDITIONING DEVICE FOR VEHICLE

(71) Applicant: DENSO CORPORATION, Kariya, Aichi-pref. (JP)

(72) Inventors: Takashi Danjyo, Kariya (JP); Takayuki Oota, Kariya (JP); Satoshi Itoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 89 days.

(21) Appl. No.: 15/569,228

(22) PCT Filed: Apr. 19, 2016

(86) PCT No.: PCT/JP2016/002086
§ 371 (c)(1),
(2) Date: Oct. 25, 2017

(87) PCT Pub. No.: WO2016/174850
PCT Pub. Date: Nov. 3, 2016

(65) Prior Publication Data
US 2018/0312041 A1    Nov. 1, 2018

(30) Foreign Application Priority Data
Apr. 28, 2015 (JP) .................... 2015-091390

(51) Int. Cl.
*B60H 1/32* (2006.01)
*B60H 1/00* (2006.01)
(Continued)

(52) U.S. Cl.
CPC ........... *B60H 1/3208* (2013.01); *B60H 1/005* (2013.01); *F28D 1/05383* (2013.01);
(Continued)

(58) Field of Classification Search
CPC combination set(s) only.
See application file for complete search history.

(56) References Cited

U.S. PATENT DOCUMENTS 5,501,268 A * 3/1996 Stovall .................. F24F 5/0017
                                                    165/236
6,230,444 B1 * 5/2001 Pause ..................... C09K 5/063
                                                    165/48.1
(Continued)

FOREIGN PATENT DOCUMENTS

JP    H06234967 A    8/1994
JP    H10278569 A   10/1998
(Continued)

*Primary Examiner* — Henry T Crenshaw
(74) *Attorney, Agent, or Firm* — Harness, Dickey & Pierce, P.L.C.

(57) ABSTRACT

An air conditioning device for a vehicle has a compressor, an evaporator, a driving condition detector, a temperature detector, and a controller. The driving condition detector detects a driving condition of the vehicle. The evaporator has a cold storage portion storing the heat from the refrigerant and having phase-change energy in at least two different temperature ranges. The controller (i) maintains the compressor being stopped while a temperature detected by the temperature detector is lower than or equal to the first temperature when the vehicle is in a coasting operation and (ii) maintains the compressor being stopped while the temperature is lower than or equal to the second temperature when the vehicle is stopped. The coasting operation is a driving condition in which a vehicle speed is lower than or equal to a specified speed and an acceleration device of the vehicle is not operated.

12 Claims, 7 Drawing Sheets

(51) Int. Cl.
  *F28D 1/053* (2006.01)
  *F28D 20/02* (2006.01)
  *F28D 21/00* (2006.01)
  *F28D 20/00* (2006.01)
  *C09K 5/06* (2006.01)

(52) U.S. Cl.
  CPC ........... *F28D 20/02* (2013.01); *F28D 20/026* (2013.01); *B60H 2001/3261* (2013.01); *B60H 2001/3266* (2013.01); *B60H 2001/3273* (2013.01); *C09K 5/063* (2013.01); *F28D 2020/0013* (2013.01); *F28D 2021/0085* (2013.01); *Y02E 60/145* (2013.01)

(56) References Cited

U.S. PATENT DOCUMENTS

| | | |
|---|---|---|
| 2002/0002837 A1 | 1/2002 | Shirota et al. |
| 2002/0088246 A1 | 7/2002 | Bureau et al. |
| 2002/0088248 A1 | 7/2002 | Bureau et al. |
| 2003/0046944 A1 | 3/2003 | Kitamura et al. |
| 2004/0093889 A1 | 5/2004 | Bureau et al. |
| 2004/0104020 A1 | 6/2004 | Haller et al. |
| 2004/0154784 A1* | 8/2004 | Pause ................ B60H 1/00285 165/41 |
| 2006/0259219 A1* | 11/2006 | Wakiyama ............ B60H 1/005 701/36 |
| 2007/0068650 A1 | 3/2007 | Haller et al. |
| 2009/0025419 A1 | 1/2009 | Kerler et al. |
| 2009/0095015 A1 | 4/2009 | Kerler et al. |
| 2010/0065244 A1 | 3/2010 | Yokoyama et al. |
| 2013/0047663 A1 | 2/2013 | Kamoshida et al. |
| 2013/0062355 A1* | 3/2013 | Shulman ............. B65D 75/002 220/592.01 |
| 2013/0221013 A1* | 8/2013 | Kolowich .......... A47J 36/2444 220/592.17 |
| 2014/0190976 A1* | 7/2014 | Imbrecht ................ B65D 19/18 220/592.01 |
| 2015/0168047 A1* | 6/2015 | Danjyo ............... F28D 1/05383 62/467 |
| 2016/0024364 A1 | 1/2016 | Yoshinari et al. |
| 2016/0047562 A1* | 2/2016 | Bartlett ................... B60H 1/00 62/115 |

FOREIGN PATENT DOCUMENTS

| | | |
|---|---|---|
| JP | 2002274165 A | 9/2002 |
| JP | 2002337537 A | 11/2002 |
| JP | 2003080933 A | 3/2003 |
| JP | 2004184071 A | 7/2004 |
| JP | 2006321949 A | 11/2006 |
| JP | 2009526194 A | 7/2009 |
| JP | 2010091250 A | 4/2010 |
| JP | 2010112670 A | 5/2010 |
| JP | 2011051393 A | 3/2011 |
| JP | 2013049349 A | 3/2013 |
| JP | 2013166845 A | 8/2013 |

* cited by examiner

AIR CONDITIONING DEVICE FOR VEHICLE

CROSS REFERENCE TO RELATED APPLICATIONS

This application is a U.S. National Phase Application under 35 U.S.C. 371 of International Application No. PCT/JP2016/002086 filed on Apr. 19, 2016 and published in Japanese as WO 2016/174850 A1 on Nov. 3, 2016. This application is based on and claims the benefit of priority from Japanese Patent Application No. 2015-091390 filed on Apr. 28, 2015. The entire disclosures of all of the above applications are incorporated herein by reference.

TECHNICAL FIELD

The present disclosure relates to an air conditioning device for a vehicle having a cold storage heat exchanger.

BACKGROUND ART

In an air conditioning device for a vehicle, a refrigeration cycle device is operated by an engine for moving the vehicle. Accordingly, the refrigeration cycle device is stopped when the vehicle temporary stops moving and the engine is stopped. Recently, needs for an idle stop vehicle, in which the engine is stopped to improve fuel efficiency when the vehicle stops moving for waiting for a traffic signal, is increased. The idle stop vehicle may not give sufficient comfortable feeling to a passenger in a vehicle compartment since the refrigeration cycle is stopped when the vehicle stops moving (i.e., when the engine is stopped). In addition, the fuel efficiency may deteriorate when the engine is re-started to secure the comfortable feeling while the vehicle is stopped.

Patent Literature 1 discloses a technique to solve the above-described issues. Specifically, Patent Literature 1 discloses an interior heat exchanger having a cold storage function to maintain the comfortable feeling while the engine is stopped. More specifically, Patent Literature 1 discloses that a cold storage reservoir, in which a cold storage material is disposed, is located downstream of a conventional evaporator. The cold storage material stores cold heat while the vehicle moves and uses the cold heat while the vehicle is stopped.

Patent Literature 2 discloses that a cold storage reservoir having a small capacity is located adjacent to tubes configuring refrigerant paths of the evaporator, and a cold storage material is disposed in the cold storage reservoir. In addition, Patent Literature 3 discloses that a normal paraffin that has high solidification and melting characteristics, which is kept stable for a long time, and has high-temperature latent heat.

Patent Literature 4 discloses that a threshold temperature is set to be higher than a temperature of air blown by an air conditioner when the vehicle moves and to be capable of securing the comfortable feeling, such that a stopping time of the vehicle is extended in an idle stop. According to Patent Literature 4, the temperature of air blown by the air conditioner becomes higher than or equal to the threshold temperature, an air conditioning request is made and an engine is re-started.

PRIOR ART LITERATURES

Patent Literature

Patent Literature 1: JP 2009-526194 T
Patent Literature 2: JP 2002-274165 A
Patent Literature 3: JP 2002-337537 A
Patent Literature 4: JP H10-278569 A

SUMMARY OF INVENTION

The fuel efficiency improves by stopping the engine in a case where the vehicle can be coasting without operating an acceleration pedal, for example, when the vehicle moves downhill. Such a moving operation of the vehicle is referred to as a freewheel operation or a coasting operation.

For example, in a domestic traveling pattern (JC08), a stoppage time (i.e., a duration while a vehicle speed is 0 km/h) is 358 seconds (29.7%) with respect to a total of traveling time of 1,200 seconds. When estimating that a deceleration amount in the coasting operation is greater than or equal to 0.6 km/h and greater than or equal to 2 km/h, a coasting time is 169 seconds (14%). Therefore, an engine stoppage time can be extended by 40% or more by stopping the engine in the coasting operation, as compared to a conventional idle stop technique.

On the other hand, a compressor is also stopped since the engine is stopped during the coasting operation similar to the conventional technique, and thereby the engine is re-started in response to an air conditioning request when a temperature of air blowing into the vehicle compartment by the air conditioner increases and a comfortable environment in the vehicle compartment cannot be kept. In addition, when the engine is stopped in the coasting operation, a duration, in which the air conditioner is operated, decreases since a duration, in which the engine is stopped, increases as compared to the conventional duration.

Then, it is considered to use a vehicle air conditioning system that has a cold storage function to maintain the comfortable environment during the idle stop, e.g., disclosed in Patent Literature 1. In this case, the temperature of air blown into the vehicle compartment by the air conditioner can be prevented from rising during the coasting operation. An idle stop duration is estimated to be about one minute, on the other hand, the coasting duration is about ten seconds. A melting temperature of the cold storage material is set to be above a target blowing temperature to maintain the air conditioner operating during the idle stop.

However, when using the cold storage material that has the high melting temperature set to maintain the air conditioner operating during the idle stop, a temperature of the cold storage material does not rise sufficiently to use stored cold heat by stopping the engine briefly, e.g., during the coasting operation. Accordingly, an increase of the temperature of air blown by the air conditioner cannot be suppressed. In other words, the melting temperature of the cold storage material is set to be higher than the target blowing temperature in view of fuel consumption, since the vehicle stops moving in the idle stop. However, uncomfortable feeling is given to the passenger when the temperature of air blown by the air conditioner rapidly increases in conjunction with a stop of the engine while the vehicle moves in the coasting operation. That is, a variation of the temperature of air is required to be small during the coasting operation even when the engine is stopped.

Figure 9:
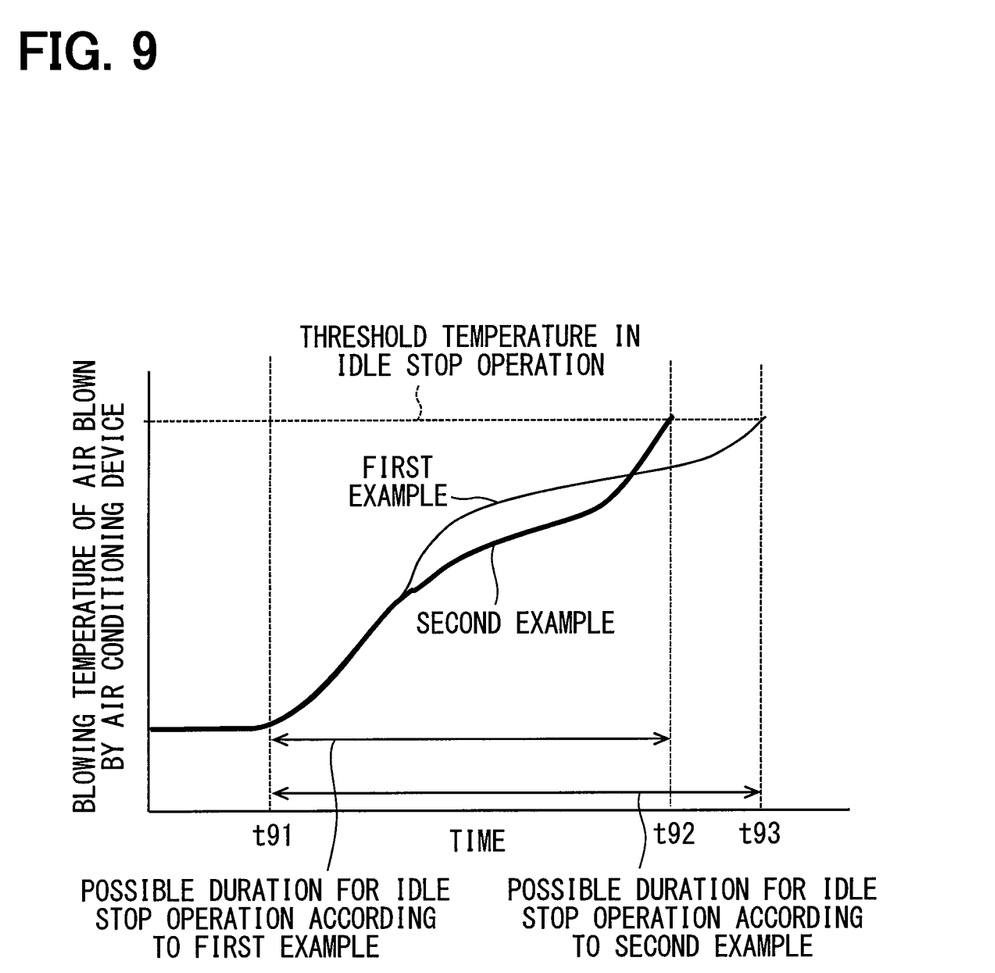
FIG. 9 is a graph showing a variation of a blowing temperature of air blown by an air conditioning device according to a conventional technique.

Then, it is considered that another cold storage material is used during the coasting operation. The cold storage material may have a melting temperature that is lower than the melting temperature of the cold storage body, which is used during the idle stop, and is close to the target blowing temperature. An example decreasing the melting temperature will be described hereafter referring to FIG. 9. In FIG. 9, a conventional cold storage material used during the idle stop is shown as a first example. Another cold storage material having a melting temperature, which is lower than that of the first example, is shown as a second example. The idle stop is started when the vehicle is stopped at time t91, and then an operation of the refrigeration cycle device is stopped. Accordingly, cold energy stored in the cold storage material is used gradually, and thereby the blowing temperature rises gradually. The blowing temperature exceeds a threshold temperature, which is set for the idle stop of the second example, at time t92. As a result, the refrigeration cycle device is required to be operated by re-starting the engine.

The blowing temperature exceeds a threshold temperature, which is set for the idle stop of the first example, at time t93. That is, the idle stop duration of the second example is shorter than the idle stop duration of the first example. The reason is that a temperature difference between an air temperature and the melting temperature increases according to the second embodiment as compared to that of the first example and thereby a consumption amount of the stored cold energy per unit time increases. Thus, the idle stop duration may be shortened only by decreasing the melting temperature of the cold storage material.

The present disclosure addresses the above issues, and it is an objective of the present disclosure to provide an air conditioning device for a vehicle that can maintain a comfortable environment in a vehicle compartment at the same time as an engine is enabled to be stopped for a long time while the vehicle stops moving and that the engine can be stopped at the same time as an increase of a blowing temperature can be suppressed during a coasting operation of the vehicle.

An air conditioning device for a vehicle according to the present disclosure has a compressor, an evaporator, a driving conditioning detector, a temperature detector, and a controller.

The compressor is operated by a power generator of the vehicle, compresses a refrigerant and discharges the refrigerant, and circulates the refrigerant in a refrigeration cycle. The evaporator is located on a low pressure side in the refrigeration cycle and cools air for air conditioning by using the refrigerant flowing in the evaporator. The driving condition detector detects a driving condition of the vehicle. The temperature detector detects a temperature of the air cooled by the evaporator. The controller controls a discharge capacity of the compressor.

The evaporator has a cold storage portion that exchanges heat with the refrigerant and stores the heat received from the refrigerant. The cold storage portion has phase-change energy in at least two different temperature ranges. One of the two different temperature ranges is a low temperature range from a third temperature to a first temperature. Another one of the two different temperature ranges is a high temperature range from the first temperature to the second temperature. The first temperature is higher than a third temperature and lower than the second temperature. The phase-change energy of the cold storage portion per unit volume or unit weight is greater in the high temperature range than in the low temperature range.

The controller maintains the compressor being stopped while the temperature detected by the temperature detector is lower than or equal to the first temperature when the driving condition detector detects that the vehicle is in a coasting operation. The coasting operation is a driving condition in which a vehicle speed is lower than or equal to a specified speed and an acceleration device of the vehicle is not operated. The controller maintains the compressor being stopped while the temperature detected by the temperature detector is lower than or equal to the second temperature when the driving condition detector detects that the vehicle is stopped.

According to the present disclosure, the evaporator has the cold storage portion. The cold storage portion stores the heat from the refrigerant, and the air for air conditioning can be cooled by cold heat stored in the cold storage portion when the compressor is stopped. Here, a capacity of the cold storage portion for storing the cold heat is limited, and thereby a temperature of the air for air conditioning rises as a cooling time in which the air is cooled elapses.

Then, the controller maintains the compressor being stopped while the temperature detected by the temperature detector is lower than or equal to the first temperature when the vehicle is moving in the coasting operation. The cold storage portion has the phase-change energy in the low temperature range lower than or equal to the first temperature, and thereby a duration, in which the temperature detected by the temperature detector is kept to be lower than or equal to the first temperature, can be extended by using the cold heat stored in the cold storage portion. As a result, the temperature of the air cooled by the evaporator can be kept to be lower than or equal to the first temperature even when the compressor is stopped while the vehicle is in the coasting operation.

In addition, the controller maintains the compressor being stopped while the temperature detected by the temperature detector is lower than or equal to the second temperature when the vehicle is stopped moving. The cold storage portion also has the phase-change energy in the high temperature range higher than or equal to the first temperature, and thereby a duration, in which the temperature detected by the temperature detector is kept to be lower than or equal to the second temperature, can be extended by using the cold heat stored in the cold storage portion. As a result, the temperature of the air cooled by the evaporator can be kept to be lower than or equal to the second temperature even when the compressor is stopped while the vehicle is stopped moving.

Furthermore, the phase-change energy of the cold storage portion per unit volume or unit weight is greater in the high temperature range than in the low temperature range. The reason is that the duration in which the vehicle is stopped moving is longer than the duration in which the vehicle is in the coasting operation, and that the phase-change energy is required to be used in the longer duration. As a result, the comfortable environment in the vehicle compartment can be maintained at the same time as the compressor is enabled to be stopped for a long time when the vehicle is stopped. In addition, the compressor is enabled to be stopped at the same time as an increase of the temperature of the air cooled by the evaporator can be suppressed when the vehicle is in the coasting operation temporary. Thus, the comfortable environment in the vehicle compartment can be maintained at the same time as fuel economy is improved.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

An embodiment of the present disclosure and modifications will be described hereinafter referring to drawings. In the modifications, a part that corresponds to or equivalents to a part described in the embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

The embodiment will be described hereafter referring to FIG. 1 to FIG. 8. An evaporator 40 configures a refrigeration cycle device 10. The refrigeration cycle device 10 is used in an air conditioning device for a vehicle. The refrigeration cycle device 10 has a compressor 20, a radiator 30, a pressure reducer 60, and the evaporator 40. Such components are connected to each other by a pipe annularly and configure a refrigerant circulation passage. The compressor 20 is operated by a power generator for moving the vehicle. The power generator is a driving power generator such as an engine 70. Accordingly, the compressor 20 is stopped when the engine 70 is stopped. The compressor 20 draws a refrigerant flowing from the evaporator 40, compresses the refrigerant, and discharges the refrigerant toward the radiator 30. That is, the compressor 20 compresses a refrigerant and discharges the refrigerant to circulate the refrigerant in a refrigeration cycle. The compressor 20 is, e.g., a belt-drive compressor and is driven by an output shaft of the engine 70. The engine 70 is disposed, e.g., in an engine chamber of the vehicle. The power generator is not limited to an internal combustion engine such as the engine 70 and may be an electric motor.

Figure 3:
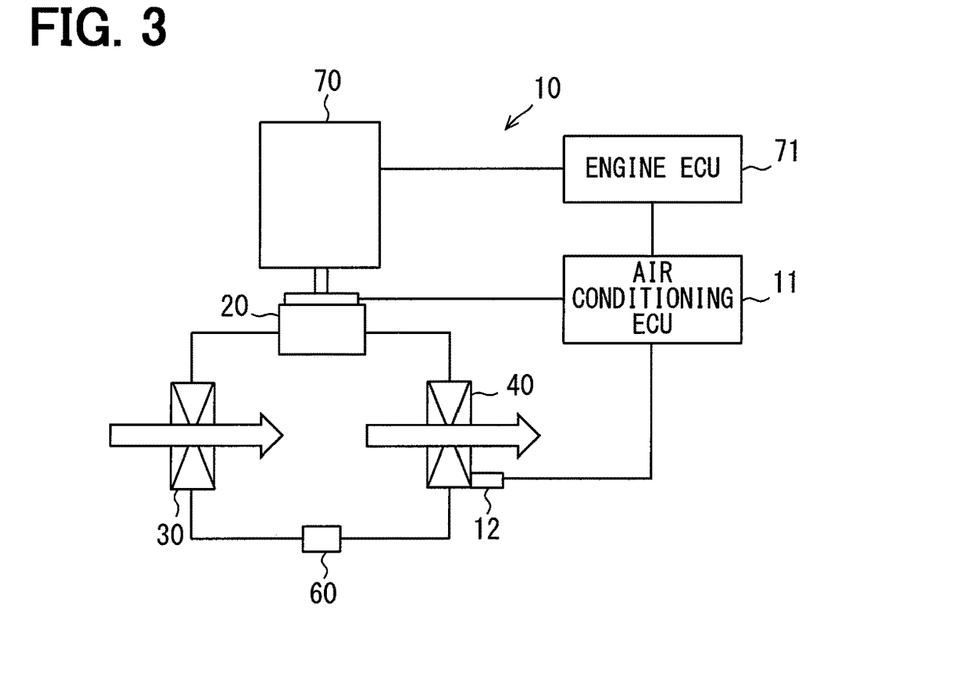
FIG. 3 is a diagram illustrating a refrigeration cycle device.

The radiator 30 cools a high-temperature refrigerant. The radiator 30 is referred to as a condenser. The pressure reducer 60 decompresses the refrigerant cooled by the radiator 30. The pressure reducer 60 may be a device such as a fixed throttle, a temperature-responsive expansion valve, and an ejector.

The evaporator 40 is located on a low pressure side in the refrigeration cycle and cools air for air conditioning by using the refrigerant flowing in the evaporator 40. The evaporator 40 evaporates the refrigerant after the refrigerant is decompressed in the pressure reducer 60 and cools the air. The evaporator 40 thereby cools the air to be supplied into the vehicle compartment. The refrigeration cycle device 10 may further have an interior heat exchanger and a tank. The interior heat exchanger performs a heat exchange between a high-pressure liquid refrigerant and a low-pressure gas refrigerant. The tank may be a receiver or an accumulator that stores an excess refrigerant.

The refrigeration cycle device 10 is controlled by an air conditioning ECU 11. The air conditioning ECU 11 is a controller and starts a calculation process and a control process when an ignition switch, which starts or stops the engine 70, is turned on and direct-current electricity is applied to the controller from a battery (not shown). The battery is a power generator disposed in the vehicle. Various switches are provided with an air conditioning operation panel and output control signals. The control signals are input to the air conditioning ECU 11. The air conditioning ECU 11 is connected to various sensors.

The air conditioning ECU 11 has a well-known microcomputer (not shown) therein. The microcomputer has CPU (i.e., central processing unit) that performs the calculation process and the control process, a memory such as ROM and RAM, and I/O port (i.e., input/output circuit). The I/O port or an A/D converter circuit converts various signals from the various sensors from AC to DC, and the various signals are input to the microcomputer.

The various sensor may be an inside air temperature sensor, an outside air temperature sensor, and an evaporator downstream temperature sensor 12. The inside air temperature sensor serves as an inside air temperature detector that detects a temperature Tr (i.e., an inside air temperature) of air around a driver seat. The outside air temperature sensor serves as an outside air temperature detector that detects an outside temperature (i.e., outside air temperature) outside the vehicle compartment. The evaporator downstream temperature sensor 12 serves as a temperature detector that detects a temperature (i.e., evaporator downstream temperature TE) of air immediately after passing through the evaporator 40. That is, the evaporator downstream temperature sensor 12 detects a temperature of the air for air conditioning after being cooled by the evaporator 40. In other words, the evaporator downstream temperature sensor 12 detects a blowing temperature of air blown into the vehicle compartment when a cooling performance of the air conditioning device is maximized.

The air conditioning ECU 11 operates a control program, which is stored in the memory in advance, when the ignition switch is turned on and the direct-current electricity is applied to the air conditioning ECU 11. Specifically, the air conditioning ECU 11 calculates a target blowing temperature TAO using data from the various sensors, and calculates a target evaporator downstream temperature TEO using the target blowing temperature TAO and the outside air temperature Tam. Subsequently, the air conditioning ECU 11 determines a volume of air to be blown by the blower, an opening degree of an air mix door, and the discharge capacity of the compressor 20 based on the target blowing temperature TAO, and then controls various devices.

The engine 70 as the power source of the vehicle is controlled by an engine ECU 71. The engine ECU 71 controls an operation condition of the engine 70 to generate a required engine torque. Specifically, the engine ECU 71 controls the operation condition of the engine 70 such that an engine torque generated by the engine 70 becomes the required engine torque in a manner that an opening degree of a throttle valve and a fuel supply volume are adjusted based on information, e.g., a rotation speed of the engine.

The engine ECU 71 communicates with the air conditioning ECU 11 such that information required for the air conditioning is transmitted and received between the engine ECU 71 and the air conditioning ECU 11. The engine ECU 71 compasses the driving condition of the vehicle, thereby serving as a driving condition detector. The driving condition (i.e., a traveling condition) includes a condition in which the vehicle is stopped moving and a condition in which the vehicle is moving. The engine ECU 71 starts operating the engine 70 when the air conditioning ECU 11 commands to operate the compressor 20. Then, the compressor 20 is started operating.

A configuration of the evaporator 40 will be described in detail hereafter referring to FIG. 1 and FIG. 2. The evaporator 40 is a cold storage heat exchanger and has a refrigerant passage member that is branched into paths. The refrigerant passage member is made of metal such as aluminum. The refrigerant passage member has headers 41, 42, 43, 44 and refrigerant tubes 45 that connects the headers 41, 43 and the headers 42, 44 to each other.

Figure 1:
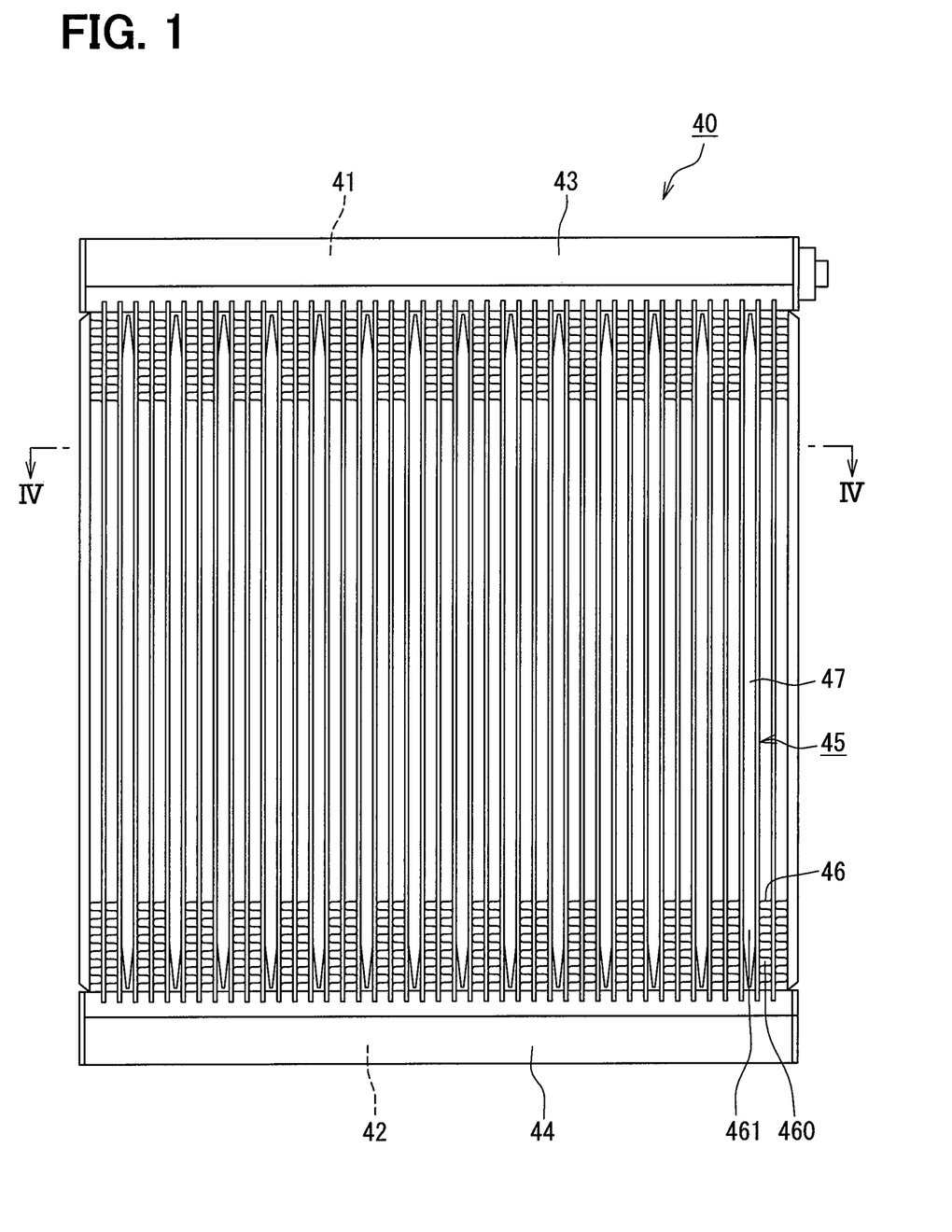
FIG. 1 is a front view illustrating an evaporator according to an embodiment.
Figure 2:
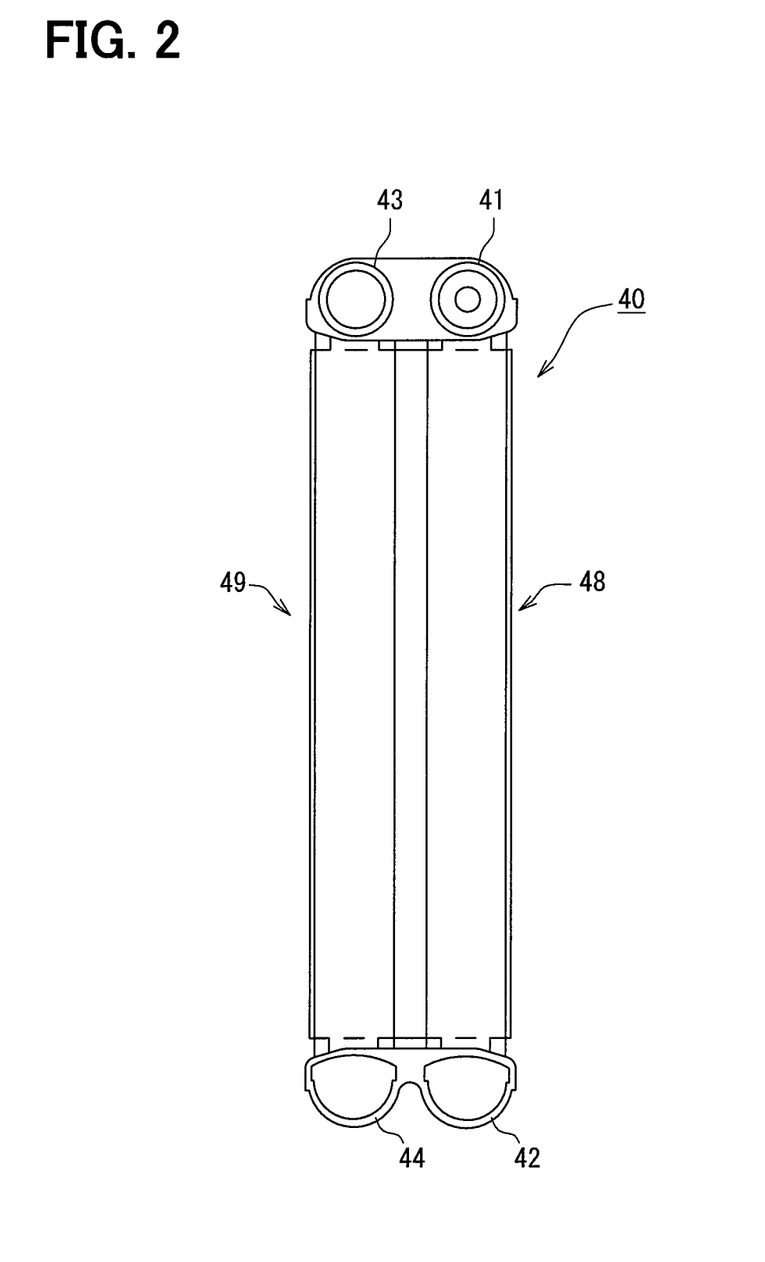
FIG. 2 is a side view illustrating the evaporator.

As shown in FIG. 1 and FIG. 2, a first header 41 and a second header 42 are a pair of headers and arranged to be parallel to each other and to be a specified distance away from each other. A third header 43 and a fourth header 44 are a pair of headers and arranged to be parallel to each other and to be a specified distance away from each other. The refrigerant tubes 45 are located between the first header 41 and the second header 42 and arranged to be equally spaced from each other. The refrigerant tubes 45 are located between the third header 43 and the fourth header 44 and arranged to be equally spaced from each other. Each of the refrigerant tubes 45 communicate with corresponding header of the headers 41, 42, 43, 44 at an end of the each refrigerant tube 45.

As shown in FIG. 2, a first heat exchanging portion 48 is configured by the first header 41, the second header 42, and the refrigerant tubes 45 located between the first header 41 and the second header 42. Similarly, a second heat exchanging portion 49 is configured by the third header 43, the fourth header 44, and the refrigerant tubes 45 located between the third header 43 and the fourth header 44. As a result, the evaporator 40 has the first heat exchanging portion 48 and the second heat exchanging portion 49 that are stacked in two layers. The first heat exchanging portion 48 is located downstream of the second heat exchanging portion 49 in a flow direction of air.

A joint (not shown) is disposed at an end of the first header 41 as a refrigerant outlet. An inside of the first header 41 is divided into a first section and a second section by a partition plate (not shown) that is located in a center portion of the inside of the first header 41 in a longitudinal direction of the first header 41. The refrigerant tubes 45 are divided into a first group and a second group to correspond to the first section and the second section. The refrigerant flows into the first section of the first header 41 and then are distributed from the first section to the first group of the refrigerant tubes 45. The refrigerant passes through the first group of the refrigerant tubes 45 and flows into the second header 42 thereby joining together. Subsequently, the refrigerant is distributed again to the second group of the refrigerant tubes 45. The refrigerant passing through the second group of the refrigerant tubes 45 flows into the second section of the first header 41. Thus, a passage that guides the refrigerant to U-turn is provided in the first heat exchanging portion 48.

A joint (not shown) is disposed at an end of the third header 43 as a refrigerant outlet. An inside of the third header 43 is divided into a first section and a second section by a partition plate (not shown) that is located in a center portion of the inside of the third header 43 in the longitudinal direction. The refrigerant tubes 45 are divided into a first group and a second group to correspond to the first section and the second section. The first section of the third header 43 is located adjacent to the second section of the first header 41. The first section of the third header 43 and the second section of the first header 41 communicate with each other.

The refrigerant flows from the second section of the first header 41 to the first section of the third header 43. The refrigerant is collected in the first section of the third header 43, distributed to the first group of the refrigerant tubes 45, and then collected in the fourth header 44 after passing through the first group of the refrigerant tubes 45. The refrigerant is distributed from the fourth header 44 to the second group of the refrigerant tubes 45, and flows into the second section of the third header 43 after passing through the second group of the refrigerant tubes 45. Thus, a passage that guides the refrigerant to U-turn is provided in the second heat exchanging portion 49. The refrigerant flowing into the second section of the third header 43 flows out of the third header 43 from the refrigerant outlet and flows to the compressor 20.

Figure 4:
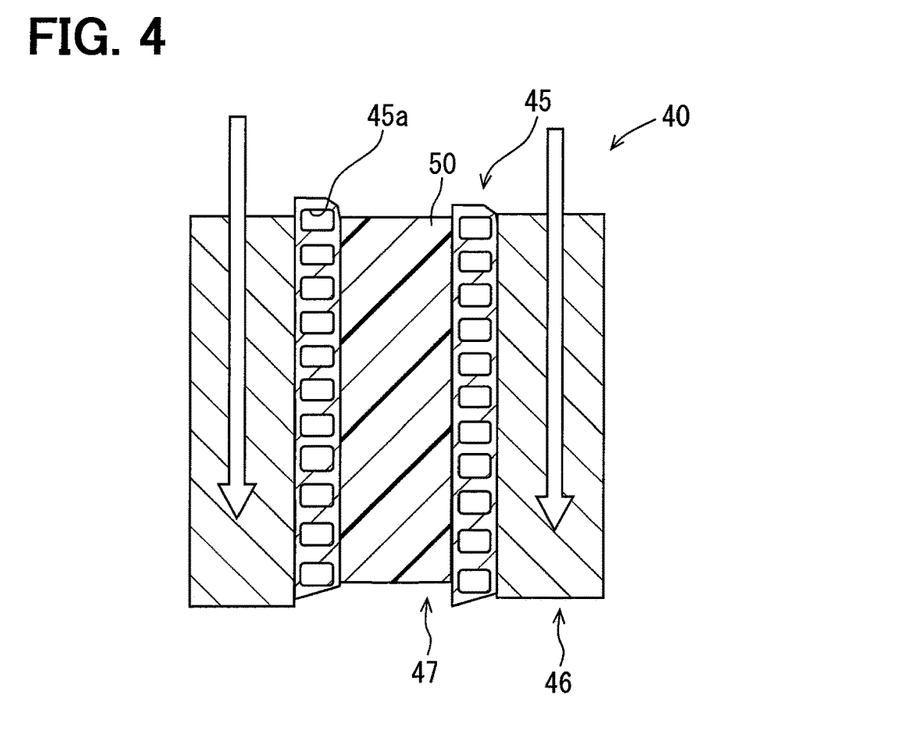
FIG. 4 is an enlarged cross-sectional view taken along a line IV-IV shown in FIG. 1.

A configuration of the refrigerant tubes 45 etc. will be described hereafter in detail. In FIG. 4, illustration of a thickness of a cold storage holder 47 is omitted and a cold storage material 50 is shown with hatching. Each of the refrigerant tubes 45 is a perforated tube having more than one hole as refrigerant passages 45a in which the refrigerant flows. The refrigerant tube 45 is referred to as a flat tube. The perforated tube is formed by extruding. The refrigerant passages 45a extend in the longitudinal direction of the refrigerant tubes 45 and are open at both ends of the refrigerant tubes 45 in the longitudinal direction respectively. The refrigerant tubes 45 are arranged side by side to form lines. In each line, main surfaces of the refrigerant tubes 45 face each other. An air passage 460 and a holder space 461 are defined between adjacent two refrigerant tubes 45 of the refrigerant tubes 45. The refrigerant flowing in the refrigerant exchanges heat with air flowing in the air passage 460. The cold storage holder 47 is disposed in the holder space 461.

The evaporator 40 has an outer fin 46. The outer fin 46 increases a contact area being in contact with the air to be blown into the vehicle compartment. The outer fin 46 is a corrugated fin. According to the present embodiment, more than one outer fin 46 is attached to the evaporator 40. The outer fin 46 is arranged in the air passage 460 defined between the adjacent two refrigerant tubes 45. The outer fin 46 is thermally connected with the adjacent two refrigerant tubes 45. Specifically, the outer fin 46 is attached to the adjacent two refrigerant tubes 45 by a joint material having great thermal conductivity. The joint material may be a brazing material. The outer fin 46 is formed in a manner that a thin metal plate, made of a metal such as aluminum, is corrugated, and thereby having a corrugated shape. The air passage 460 is referred to as a louver.

A configuration of the cold storage holder 47 will be described hereafter. The cold storage holder 47 is a cold storage portion holding the cold storage material 50 therein. The cold storage holder 47 has a flat tube shape. The cold storage holder 47 has one end and an other end in the longitudinal direction. The one end and the other end are pressed in a thickness direction of the cold storage holder 47, and thereby a space in which the cold storage material 50 is disposed is defined in the cold storage holder 47. The cold storage holder 47 has two main surfaces facing each other and another surface other than the two main surfaces. An area of each of the two main surface is larger than an area of the another surface. The two main surfaces are provided by two main walls. The two main walls are arranged to be parallel to the refrigerant pipes 45. At least one of the two main surfaces is in contact with one of the adjacent two refrigerant tubes 45. According to the present embodiment, both of the two main surfaces are in contact with the adjacent two refrigerant tubes 45 respectively.

The cold storage holder 47 is arranged between the adjacent two refrigerant tubes 45 and is thermally connected with the adjacent two refrigerant tubes 45. The cold storage holder 47 is attached to the adjacent two refrigerant tubes 45 by a joining material having great thermal conductivity. The joining material may be a resin material such as a brazing material or an adhesive material. According to the present embodiment, the cold storage holder 47 is attached to the adjacent two refrigerant tubes 45 by brazing. A great amount of the brazing material is positioned between the cold storage holder 47 and each of the adjacent two refrigerant tubes 45, such that a contact area between the cold storage holder 47 and the adjacent two refrigerant tubes 45 becomes large. For example, a foil made from the brazing material may be positioned between the cold storage holder and each of the adjacent two refrigerant tubes 45. As a result, heat can be transferred between the cold storage holder 47 and the adjacent two refrigerant tubes 45 effectively.

A dimension of the cold storage holder 47 in a thickness direction of the cold storage holder 47 is substantially the same as a dimension of the air passage 460 in the thickness direction. That is, the dimension of the cold storage holder 47 in the thickness direction is substantially the same as a dimension of the outer fin 46 in the thickness direction. Therefore, a position and the outer fin 46 and a position of the cold storage holder 47 can be reversed. As a result, arrangement of the more than one outer fin 46 and more than one cold storage holder 47 can be flexible.

A length of the cold storage holder 47 in the longitudinal direction is substantially the same as a length of the outer fin 46 in the longitudinal direction. As a result, the cold storage holder 47 occupies substantially an entirety of the holder space 461 in the longitudinal direction. Here, a void is defined between the cold storage holder 47 and the headers 41, 42, 43, 44. The void may be preferable to be filled with a part of the outer fin 46 or a filler made of material such as resin.

The refrigerant tubes 45 are arranged at substantially regular intervals. A void is defined between each adjacent two refrigerant tubes 45. That is, a quantity of the void is more than one. The more than one outer fin 46 and the more than one cold storage holder 47 are arranged in the voids in a specified pattern. Some of the voids are the air passages 460 respectively. The rest of the voids are the holder spaces 461 respectively. For example, a percentage of the voids providing the holder spaces 461 is 10% or more and 50% or less in the total quantity of the voids. The cold storage holder 47 is positioned in the holder space 461.

The more than one cold storage holder 47 is distributed evenly throughout the evaporator 40. The adjacent two refrigerant tubes 45, between which the cold storage holder 47 is disposed, are adjacent to two adjacent air passages 460 respectively. That is, each of the adjacent two refrigerant tubes 45 is located between the cold storage holder 47 and the air passage 460. In other words, two of the refrigerant tubes 45 are positioned between two of the outer fins 46, and a pair of the cold storage holders 47 is positioned between the two of the refrigerant tubes 45. In other words, two cold storage holders 47 are arranged between the two of the refrigerant tubes 45.

The cold storage holder 47 is made of metal such as aluminum or an aluminum alloy. When the cold storage holder 47 is made of material other than aluminum, the material contains a metal, which has lower ionization tendency as compared to hydrogen, as a base or a component.

The cold storage material 50 will be described hereafter. The cold storage material 50 exchanges heat with the refrigerant flowing in the refrigerant passage 45*a* and stores the heat. The cold storage material 50 stores the heat when being solidified and dissipates the stored heat when being melted.

The cold storage material 50 is made from paraffin. A melting point and a melting heat vary depending on a carbon number. The melting point of paraffin rises as the carbon number increases. A melting point of the cold storage material 50 is preferably in a temperature range (e.g., from 0° C. to 20° C.) that is within a temperature range under the air conditioning device is operated.

The melting temperature is preferred to be higher than 0° C. by the following reason. When the evaporator 40 operates in a cooling mode, water in the air is condensed and the condensed water is attached to the evaporator 40. The condensed water attached to the evaporator 40 and the cold storage holder 47 is solidified when a temperature of the cold storage material 50 falls below 0° C., and thereby the air passage 460 defined in the evaporator 40 may be closed. A performance of the evaporator 40 deteriorates drastically when the air passage 460 is closed, and thereby a temperature of the evaporator 40 is preferred to be higher than 0° C. Therefore, the melting point of the cold storage material 50 is preferred to be higher than 0° C.

The melting point is preferred to be lower than or equal to 20° C. by the following reason. A passenger feels uncomfortable when a temperature in the vehicle compartment becomes about 20° C. in the idle stop. Accordingly, when the temperature in the vehicle compartment reaches 20° C., the air conditioning device starts operating the cooling mode. All of the cold heat stored in the cold storage material 50 is used before the temperature in the vehicle compartment becomes 20° C. by setting the melting point of the cold storage material 50 to be lower than or equal to 20° C. As a result, the air conditioning device can operate efficiently.

According to the present embodiment, the cold storage material 50 is a paraffin mixture containing paraffin as a base. The paraffin mixture contains two kinds of paraffin. Specifically, the cold storage material 50 is the paraffin mixture of fifteen-carbon paraffin and sixteen-carbon paraffin.

Figure 6:
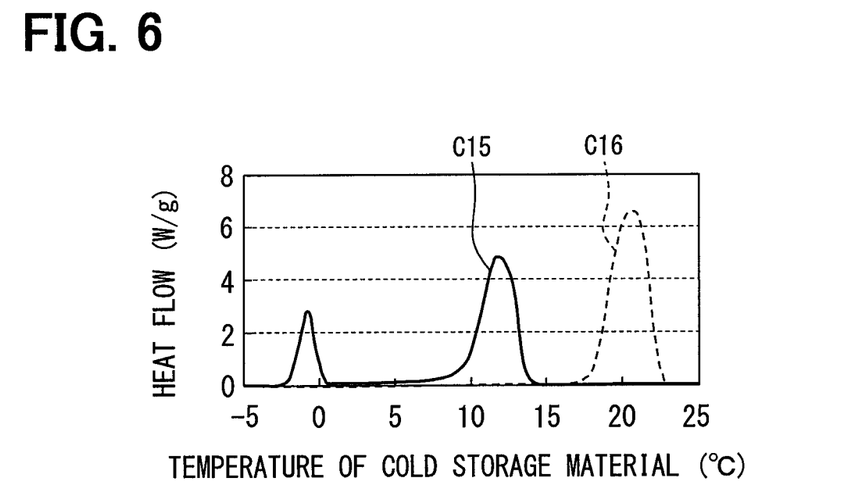
FIG. 6 is a graph showing latent heat of fifteen-carbon paraffin and sixteen-carbon paraffin.

A latent heat of the fifteen-carbon paraffin and a latent heat of the sixteen-carbon paraffin have different maximum temperatures as shown in FIG. 6. The latent heat of the fifteen-carbon paraffin has two peaks. Specifically, the latent heat of the fifteen-carbon paraffin has the two peaks at about −1° C. and 12° C. The latent heat of the sixteen-carbon paraffin has a peak at about 21° C.

Figure 5:
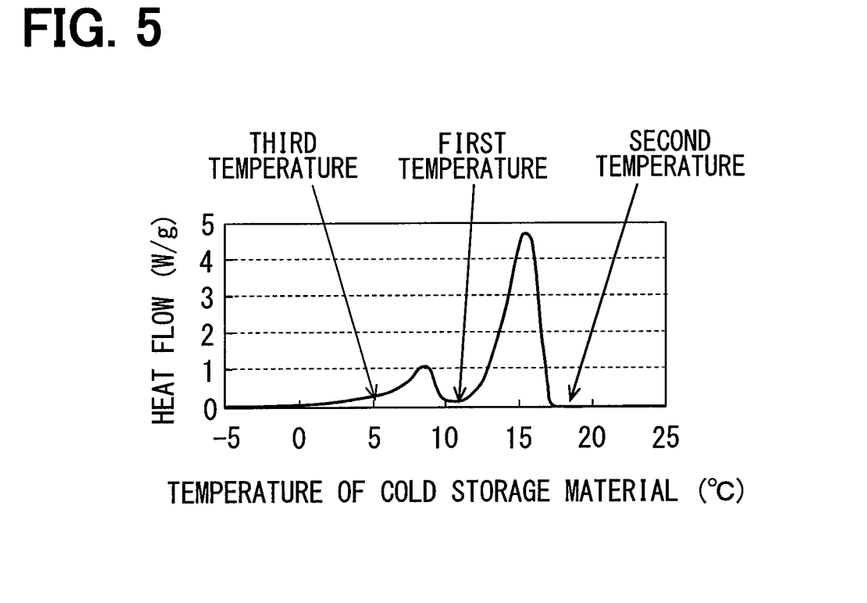
FIG. 5 is a graph showing latent heat of a cold storage material.

As described above, the cold storage material 50 of the present embodiment contains the paraffin mixture of the fifteen-carbon paraffin and the sixteen-carbon paraffin as the base. As shown in FIG. 6, the latent heat of the sixteen-carbon paraffin is higher than the latent heat of the fifteen-carbon paraffin. A latent heat of the paraffin mixture has two peaks as shown in FIG. 5. One of the two peaks is in a temperature range from a third temperature to a first temperature, and the other one of the two peaks is in a temperature range from the first temperature to a second temperature. In other words, the latent heat of the paraffin mixture has one minimum temperature near the first temperature. Since a phase of the cold storage material 50 changes in the temperature ranges including the peaks of the latent heat, the cold storage material 50 has phase-change energy in different temperature ranges.

The first temperature, the second temperature, and the third temperature are set in advance. The third temperature is lower than the first temperature, and the second temperature is higher than the first temperature. In other words, the first temperature is higher than the third temperature and lower than the second temperature. For example, the second temperature is higher than 10° C. and lower than or equal to 20° C. when the first temperature is higher than or equal to 0° C. and lower than or equal to 10° C. Alternatively, the second temperature is higher than 15° C. and lower than or equal to 20° C. when the first temperature is higher than or equal to 10° C. and lower than or equal to 15° C. In an example of the cold storage material 50 shown in FIG. 5, the first temperature is 10° C., the second temperature is 18° C., and the third temperature is 5° C.

The cold storage material 50 has latent heat in two or more temperature ranges. According to the present embodiment, one of the two temperature range is a low temperature range from the third temperature to the first temperature. The other one of the two temperature range is a high temperature range from the first temperature to the second temperature. In other words, the cold storage material 50 of the present embodiment has latent heat in the low temperature range from the third temperature to the first temperature and in the high temperature range from the first temperature and the second temperature.

Diagram 1 shows a composition ratio of the fifteen-carbon paraffin (C15) and the sixteen-carbon paraffin (C16) and latent heat of the paraffin mixture in the low temperature range and the high temperature range.

[Diagram 1]

| Composition Ratio | | | |
|---|---|---|---|
| Paraffin (C15) (%) | Paraffin (C16) (%) | Latent Heat In Low Temperature Range (kj/L) | Latent Heat In High Temperature Range (kj/L) |
| 25 | 75 | 22 | 169 |
| 30 | 70 | 28 | 152 |
| 20 | 80 | 10 or less | 173 |
| 0 | 100 | 10 or less | 10 or less |
| 100 | 0 | 19 | 134 |

As shown in Diagram 1, the latent heat is almost zero in the low temperature range lower than the first temperature when the composition ratio of the sixteen-carbon paraffin increases. Accordingly, the composition ratio of the sixteen-carbon paraffin is preferred to be lower than 80 mass percent. In addition, the coasting duration is shorter than the idle stop duration, thereby requiring less amount of cold heat. As a result, the cold heat is not stored excessively when the temperature of the cold storage material 50 is the first temperature or lower. Therefore, the latent heat in the low temperature range from the third temperature to the first temperature is preferred to be larger than the latent heat in the high temperature range from the first temperature to the second temperature. Furthermore, the idle stop duration is preferred to be longer than that of the fifteen-carbon paraffin. In other words, the phase-change energy of the cold storage material 50 per unit volume or per unit weight in the low temperature range is preferred to be larger than the phase-change energy of the cold storage material 50 per unit volume or per unit weight in the high temperature range.

Thus, the composition ratio of the sixteen-carbon paraffin having high latent heat is preferred to be larger than the composition ratio of the fifteen-carbon paraffin. The composition ratio of the sixteen-carbon paraffin is also preferred to be less than 80%. For example, a concentration of the fifteen-carbon paraffin in the cold storage material 50 is preferred to be higher than 20 mass percent and lower than 50 mass percent. A concentration of the sixteen-carbon paraffin in the cold storage material 50 is preferred to be higher than 50 mass percent and lower than 80 mass percent.

An operation of the air conditioning device according to the present embodiment will be described hereafter. The compressor 20 is operated by the engine 70 when an air conditioning request, e.g., a cooling request, is commanded by the passenger. The compressor 20 draws the refrigerant flowing from the evaporator 40, compresses the refrigerant, and discharges the compressed refrigerant. The compressed refrigerant discharged by the compressor 20 dissipates heat in the radiator 30. The refrigerant flowing out of the radiator 30 is decompressed in the pressure reducer 60 and then flows to the evaporator 40. The refrigerant cools the air through the outer fin 46 and also cools the cold storage holder 47 while being evaporated in the evaporator 40.

When the vehicle stops moving temporary, the engine 70 is stopped to save energy and thereby the compressor 20 is stopped. Specifically, the air conditioning ECU 11 maintains the compressor 20 to be stopped while the blowing temperature is lower than or equal to the second temperature when it is determined the vehicle is stopped moving based on information from the engine ECU 71.

A cooling performance of the refrigerant in the evaporator 40 decreases gradually after the compressor 20 is stopped. The cold storage material 50 dissipates cold heat to cool the air while the cooling performance of the refrigerant decreases. At this time, heat of the air transfers to the cold storage material 50 through the outer fin 46, the refrigerant tubes 45, and the cold storage holder 47. As a result, the cold storage material 50 can cool the air even when the refrigeration cycle device 10 is stopped temporary. When the vehicle starts moving, the engine 70 is started thereby starting operating the compressor 20. Therefore, the refrigeration cycle device 10 restarts cooling the cold storage material 50, and the cold storage material 50 stores cold heat. When the blowing temperature exceeds the second temperature, the engine 70 restarts the compressor 20. As a result, a deterioration of an environment in the vehicle compartment can be suppressed by operating the compressor 20 even when the idle stop duration extends and the cold heat stored in the cold storage material 50 is run out.

Figure 7:
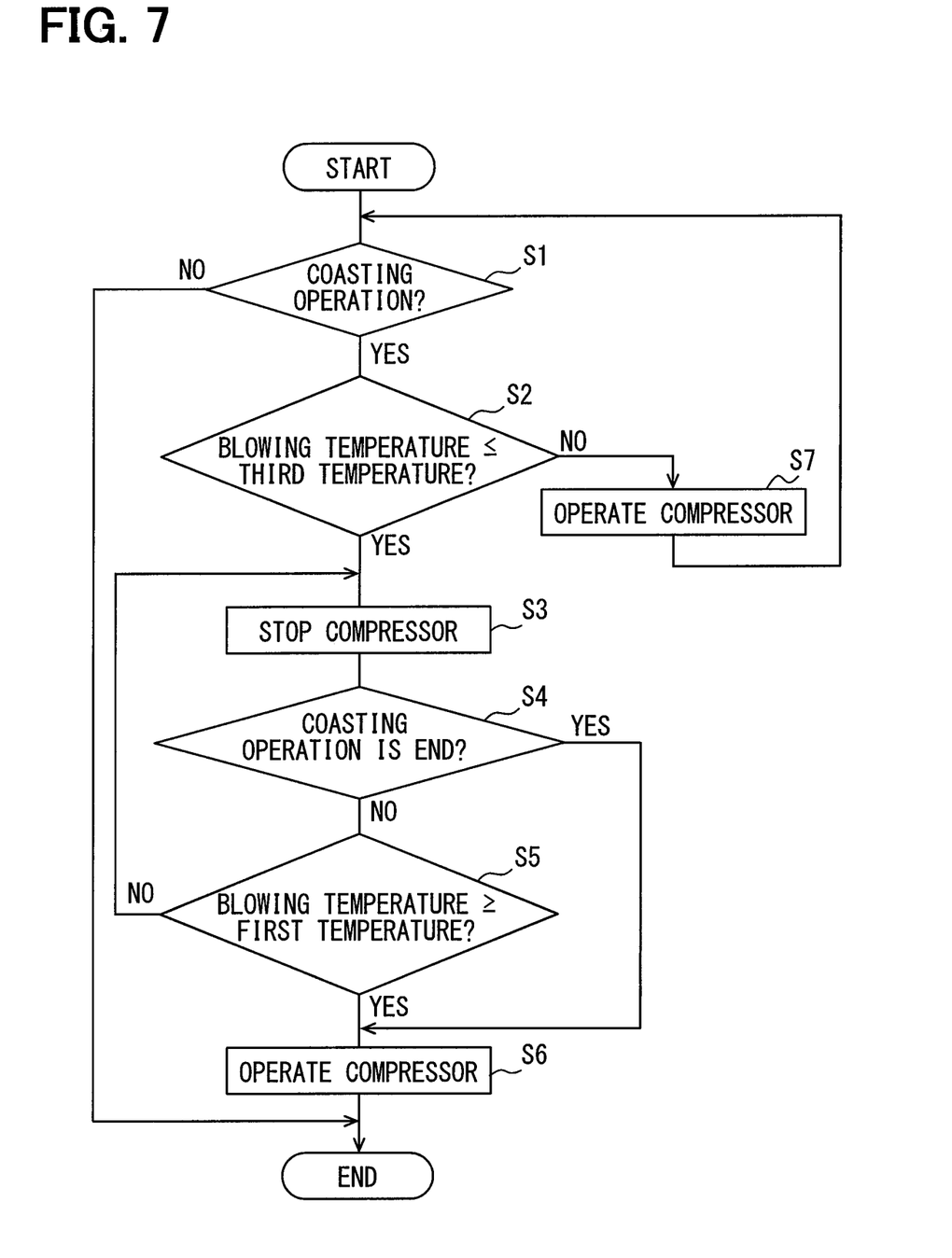
FIG. 7 is a flow chart showing how to control a compressor in a coasting operation.

A control flow operated by the air conditioning ECU 11 in the coasting operation will be described hereafter. The control flow is shown in FIG. 7. The control flow is operated repeatedly by the air conditioning ECU 11 when the air conditioning device for a vehicle is operated. At S1, the air conditioning ECU 11 determines whether the vehicle is in the coasting operation based on the information from the engine ECU 71. When the vehicle is determined to be in the coasting operation at S1, the control flow advances to S2. When the vehicle is determined not to be in the coasting operation at S1, the control flow is end. The vehicle is determined to be in the coasting operation when a deceleration amount is within a specified range. The specified range is, for example, from 0.6 km/h to 2 k/h per second. In addition, the vehicle is also determined to be in the coasting operation when a gas pedal, which is an acceleration device, is not pressed. Alternatively, the vehicle is also determined to be in the coasting operation when the vehicle is not decelerated however a vehicle speed is a specified speed or lower, e.g., when the vehicle goes a downhill, and the gas pedal is not pressed.

At S2, the air conditioning ECU 11 compares the blowing temperature, which is a temperature of air blown by the air conditioning device into the vehicle compartment, with the third temperature. The control flow advances to S3 when the blowing temperature is the third temperature or lower and advances to S7 when the blowing temperature is higher than the third temperature. The air conditioning ECU 11 determines a cold storage of the cold storage material 50 is completed and stops the compressor 20 at S3. Then the control flow advances to S4. Since the temperature of the cold storage material 50 is the third temperature or lower in the coasting operation even when the engine 70 is stopped, and thereby the blowing temperature can be maintained to be lower than or equal to the first temperature by using the cold heat stored in the cold storage material 50. Therefore, the cold storage material 50 can suppress an increase of the blowing temperature even when the compressor 20 is stopped.

At S4, it is determined whether the coasting operation is end and the vehicle is moving in a normal operation. The control flow advances to S6 when it is determined the coasting operation is end and advances to S5 when it is determined the coasting operation is not end. At S5, it is determined whether the blowing temperature is higher than or equal to the first temperature. The control flow advances to S6 when it is determined the blowing temperature is higher than or equal to the first temperature, and returns to S3 when it is determined the blowing temperature is not higher than or equal to the first temperature. Accordingly, the compressor 20 is stopped when the blowing temperature becomes the first temperature or higher in the coasting operation.

That is, the compressor 20 is started at S6 and the control flow is end when it is determined the coasting operation is end or when it is determined the blowing temperature becomes the first temperature or higher. When the coasting operation is end, the engine 70 is started and thereby operating the compressor 20. When the blowing temperature becomes the first temperature or higher, the blowing temperature becomes too high to maintain a comfortable environment of the vehicle compartment, thereby the engine 70 is operated to operate the compressor and decrease the blowing temperature. That is, the first temperature is substantially equal to the blowing temperature.

When the vehicle is in the coasting operation and the blowing temperature is higher than the third temperature (S2: NO), the cold storage material 50 may not store the cold heat sufficiently. Accordingly, the compressor 20 is started at S7, and the control flow returns to S1. That is, the compressor 20 continues operating even in the coasting operation, while the blowing temperature is higher than the third temperature. Thus, the cold storage material 50 exchanges heat with the refrigerant and stores the cold heat.

As described above, the air conditioning ECU 11 maintains the compressor 20 being stopped while the blowing temperature is lower than or equal to the first temperature in the coasting operation based on the information from the engine ECU 71. Accordingly, the engine 70 can be stopped in the coasting operation. Even when the engine 70 is stopped, the blowing temperature can be kept to be lower than or equal to the first temperature by using the cold heat stored in the cold storage material 50.

Figure 8:
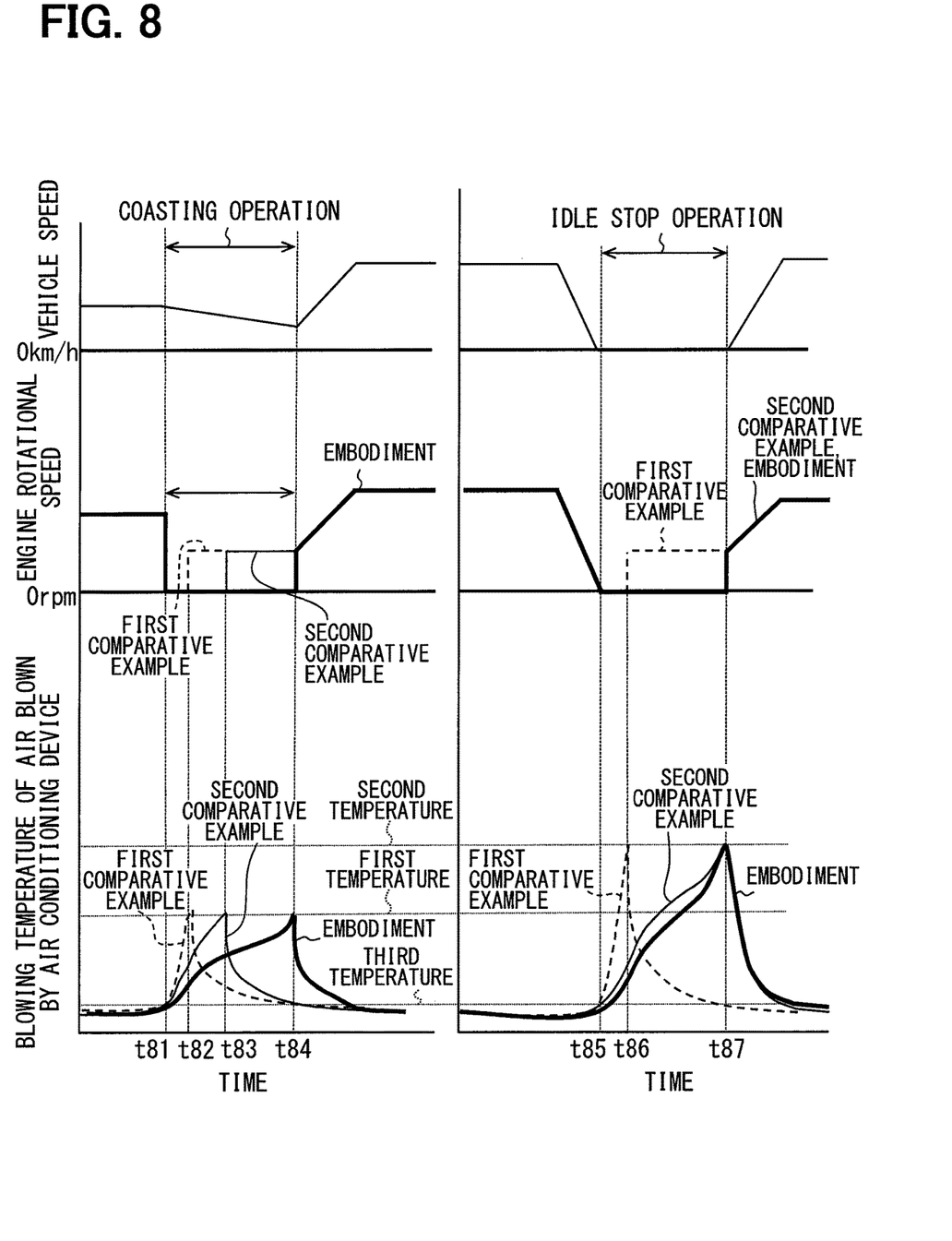
FIG. 8 is a timing diagram showing a variation of a blowing temperature of air blown by an air conditioning device.

A starting timing of the compressor 20 in the coasting operation and in the idle stop operation will be described hereafter referring to FIG. 8. FIG. 8 shows waveforms regarding a first comparative example, a second comparative example, and the present embodiment. A dashed line shows the first comparative example. According to the first comparative example, an air conditioning device does not have a cold storage function. A thin line shows the second comparative example. According to the second comparative example, an air conditioning device has a cold storage material 50 that is made from the fifteen-carbon paraffin. A thick line shows the present embodiment. According to the present embodiment, the air conditioning device has the cold storage material 50 that is made from the paraffin mixture. The paraffin mixture has the latent heat as shown in FIG. 5.

In FIG. 8, the waveforms in the coasting operation are shown on the left side, and the waveforms in the idle stop operation are shown on the right side. The waveforms in the coasting operation will be described first. The coasting operation starts at time t81. At this time, a rotational speed of the engine 70 is zero. Accordingly, the compressor 20 is stopped. According to the first comparative example having no cold storage material 50, the blowing temperature rises quickly and reaches the target blowing temperature, which is the first temperature, at time t82. Therefore, the engine 70 is operated to start the compressor 20 at time t82 according to the first comparative example.

According to the second comparative example, the blowing temperature reaches the target blowing temperature at time t83. Therefore, the engine 70 is operated to start the compressor 20 at time t83 according to the second comparative example. As described above, the cold storage material 50 of the second comparative example is made from the fifteen-carbon paraffin. The latent heat of the fifteen-carbon paraffin is small in the low temperature range, and a difference between the melting point of the fifteen-carbon paraffin and the blowing temperature is large. Accordingly, the blowing temperature reaches the target blowing temperature promptly.

Here, in an example shown in FIG. 8, the gas pedal is pressed to accelerate the vehicle at time t84, and the blowing temperature reaches the target blowing temperature at time t84 according to the present embodiment. Therefore, according to the present embodiment, the engine 70 can be stopped until the coasting operation is end.

The waveforms in the idle stop operation will be described next. The vehicle speed becomes zero and the engine 70 is stopped at time t85. Accordingly, the compressor 20 is stopped. According to the first comparative example having no cold storage material 50, the blowing temperature rises quickly as described above and reaches the target blowing temperature, which corresponds to the first temperature, at time t86. Therefore, according to the first comparative example, the engine 70 is started to operate the compressor 20 at time t86.

According to the second comparative example and the present embodiment, the blowing temperature reaches the target blowing temperature at time t87 later than the blowing temperature of the first comparative example. Then, the gas pedal is pressed and the vehicle speed starts increasing at time t87. That is, according to the second comparative example and the present embodiment, the engine 70 can be stopped until the idle stop operation is end. According to the present embodiment, the engine 70 can be stopped until the idle stop operation is end similar to the second comparative example, and exerts a greater cold storage performance in the coasting operation as compared to the second comparative example.

As described above, the comfortable environment of the vehicle compartment can be maintained by restarting the compressor 20 even when the blowing temperature is the second temperature or lower in the idle stop operation. On the other hand, in a case where the coasting operation is performed in addition to the idle stop operation, the compressor 20 may be required to restart even when the blowing temperature is lower than or equal to the first temperature, which is lower than the second temperature, so as to suppress an increase of the temperature in the vehicle compartment. However, the cold storage material of the second comparative example dissipates a large amount of cold heat while the blowing temperature is between the first temperature and the second temperature. Specifically, since the melting point of the cold storage material of the second comparative example is higher than the first temperature, the blowing temperature rises promptly and exceeds the first temperature in the coasting operation. Accordingly, the engine 70 is required to be restarted soon after being stopped so as to operate the compressor 20. In contrast, according to the present embodiment, an increase of the blowing temperature can be suppressed as compared to the second comparative example since the cold storage material 50 can store cold heat at a temperature lower than the first temperature.

As described above, the evaporator 40 of the present embodiment has the cold storage holder 47. The cold storage holder 47 houses the cold storage material 50. Accordingly, the cold storage material 50 stores cold heat from the refrigerant, and the air to be blown into the vehicle compartment can be cooled using the cold heat stored in the cold storage material 50 when the compressor 20 is stopped. A capacity of the cold storage material 50 to store the cold heat is limited, thereby the temperature of the air rises as a time elapses from starting cooling the air by the cold heat.

The air conditioning ECU 11 maintains the compressor 20 being stopped while the blowing temperature is lower than or equal to the first temperature in the coasting operation. The cold storage material 50 has the phase-change energy in the low temperature lower than or equal to the first temperature, thereby the blowing temperature can be kept lower than or equal to the first temperature for a long time by using the cold heat stored in the cold storage material 50. As a result, the temperature of the blowing air can be maintained to be lower than or equal to the first temperature when the compressor 20 is stopped in the coasting operation.

In addition, the air conditioning ECU 11 stops the compressor when the vehicle is stopped and the blowing temperature is lower than or equal to the second temperature. The cold storage material 50 has the phase-change energy in the high temperature range higher than or equal to the first temperature, thereby the blowing temperature can be kept lower than the second temperature for a long time by using the cold heat stored in the cold storage material 50. As a result, the blowing temperature can be maintained to be lower than or equal to the second temperature when the compressor 20 is stopped while the vehicle is stopped.

Moreover, the phase-change energy of the cold storage material 50 per unit volume or per unit weight in the high temperature range is greater than the phase-change energy of the cold storage material 50 per unit volume or per unit weight in the low temperature range by the following reasons. That is, the duration in which the vehicle is stopped is longer than the duration in which the vehicle is in the coasting operation, thereby using greater amount of the phase-change energy as compared to the duration in which the vehicle is in the coasting operation. As a result, the compressor 20 can be stopped for a long time while the vehicle is stopped, thereby the comfortable environment of the vehicle compartment can be maintained. In addition, the compressor 20 can be stopped while an increase of the blowing temperature is suppressed when operating the coasting operation briefly. Therefore, the comfortable environment of the vehicle compartment can be maintained while improving the fuel efficiency.

According to the present embodiment, the air conditioning ECU 11 is preferred to control the compressor 20 such that the blowing temperature is lower than or equal to the third temperature when the vehicle is moving not in the coasting operation. As a result, the cold storage performance of the cold storage material 50 storing the cold heat is maximized. Since the cold storage performance of the cold storage material 50 is maximized, the compressor 20 can be maintained to be stopped in the idle stop operation and in the coasting operation.

Modifications

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure.

It should be understood that structures described in the above-described embodiments are preferred structures, and the present disclosure is not limited to have the preferred structures. The scope of the present disclosure includes all modifications that are equivalent to descriptions of the present disclosure or that are made within the scope of the present disclosure.

(1) According to the above-described embodiment, the composition of the cold storage material 50 is fixed. However, cold storage materials having different paraffin compositions may be disposed in the cold storage holders 47 respectively. In other words, at least two cold storage materials exerting different cold storage performances may be disposed in the cold storage holders 47 (i.e., the holder spaces 461). That is, the cold storage material 50 may be one of the cold storage materials (i.e., a cold storage portion) having different paraffin compositions. It means that adjacent two cold storage materials may exert different cold storage performances. In this case, one cold storage material (i.e., a first cold storage material) of the two cold storage materials is set to have the phase-change energy in the low temperature range, and the other cold storage material (i.e., a second cold storage material) of the two cold storage materials is set to have the phase-change energy in the high temperature range.

A total capacity of the first cold storage material for storing the cold heat is larger than a total capacity of the second cold storage material for storing the cold heat. The total capacity is given by multiplying the phase-change energy per unit volume or per unit weight by an amount of the cold storage material disposed in the cold storage holder 47. According to this modification, the same operations and effects as the above-described embodiment can be obtained. Compositions of the first cold storage material and the second cold storage material may be modified, for example, as the following first example to fourth example when using the two cold storage materials.

FIRST EXAMPLE

The first cold storage material may be fourteen-carbon paraffin. The fourteen-carbon paraffin has a melting point at 6° C. The second cold storage material may be the fifteen-carbon paraffin. The fifteen-carbon paraffin has a melting point at 10° C.

SECOND EXAMPLE

The first cold storage material may be the fourteen-carbon paraffin. The second cold storage material may be the paraffin mixture of the fifteen-carbon paraffin and the sixteen-carbon paraffin. The composition ratio of the fifteen-carbon paraffin in the paraffin mixture is higher than 20 mass percent and lower than 50 mass percent, and the composition ratio of the sixteen-carbon paraffin in the paraffin mixture is higher than 50 mass percent and lower than 80 mass percent.

THIRD EXAMPLE

The first cold storage material may be the fifteen-carbon paraffin. The second cold storage material may be the paraffin mixture of the fifteen-carbon paraffin and the sixteen-carbon paraffin. The composition ratio of the fifteen-carbon paraffin in the second cold storage material is higher than 20 mass percent and lower than 50 mass percent, and the composition ratio of the sixteen-carbon paraffin in the second cold storage material is higher than 50 mass percent and lower than 80 mass percent.

FOURTH EXAMPLE

Each of the first cold storage material and the second cold storage material may be the paraffin mixture of the fifteen-carbon paraffin and the sixteen-carbon paraffin. Both in the first cold storage material and the second cold storage material, the composition ratio of the fifteen-carbon paraffin in the paraffin mixture is higher than 20 mass percent and lower than 50 mass percent, and the composition ratio of the sixteen-carbon paraffin in the paraffin mixture is higher than 50 mass percent and lower than 80 mass percent. The composition ratio of the fifteen-carbon paraffin in the first cold storage material is greater than the composition ratio of the fifteen-carbon paraffin in the second cold storage material. As shown in Diagram 1, the latent heat in the high temperature range increases as the composition ratio of the fifteen-carbon paraffin decreases, and the latent heat in the low temperature range increases as the composition ratio of the fifteen-carbon paraffin increases. The high temperature range is higher than or equal to the first temperature and lower than or equal to the second temperature. The low temperature range is higher than or equal to the third temperature and lower than or equal to the first temperature.

(3) Three or more cold storage materials may be used. In this case, cold heat can be stored in many stage, thereby the cold can be stored in a larger temperature range.

(4) The refrigerant tubes 45 are not limited to be the perforated tube formed by extruding and may be a tube formed in a manner that a plate having dimples is bent. The fin is not necessarily provided. Such heat exchanger having no fin is called a fin-less heat exchanger. The refrigerant tubes 45 may have protruding portions instead of the fin to promote a heat exchange between the refrigerant and the air.

The cold storage holder 47 is not limited to be positioned outside the refrigerant tubes 45 and may be positioned inside the refrigerant passage.

(5) The present disclosure may be employed to other evaporators having various passages. For example, the heat exchanger is not limited to guide the refrigerant to U-turn between a left side and a right side as in the above-described embodiment, and may guide the refrigerant to flow in one direction or may guide the refrigerant to U-turn between a front side and a rear side.

(6) According to the above-described embodiment, the evaporator downstream temperature sensor 12 detects the temperature of the air after being cooled in the evaporator 40. However, a temperature detector may detect a temperature of the cold storage material 50 directly or may detect a temperature of the evaporator 40 directly.

What is claimed is:
1. An air conditioning device for a vehicle, comprising:
a compressor that is operated by a power generator of the vehicle, compresses a refrigerant and discharges the refrigerant, and circulates the refrigerant in a refrigeration cycle;
an evaporator that is located on a low pressure side in the refrigeration cycle and cools air for air conditioning by using the refrigerant flowing in the evaporator;
a driving condition detector that detects a driving condition of the vehicle;
a temperature detector that detects a temperature of the air cooled by the evaporator; and
a controller that controls a discharge capacity of the compressor, wherein
the evaporator has a cold storage portion that is cooled by the refrigerant by exchanging heat with the refrigerant,
the cold storage portion has phase-change energy in at least two different temperature ranges,
one of the two different temperature ranges is a low temperature range from a third temperature to a first temperature,
an other one of the two different temperature ranges is a high temperature range from the first temperature to a second temperature,
the first temperature is higher than the third temperature and lower than the second temperature,
the phase-change energy of the cold storage portion per unit volume or unit weight is greater in the high temperature range than in the low temperature range,
the controller
maintains the compressor being stopped while the temperature detected by the temperature detector is lower than or equal to the first temperature when the driving condition detector detects that the vehicle is in a coasting operation, the coasting operation being one driving condition in which a vehicle speed is lower than or equal to a specified speed and an acceleration device of the vehicle is not operated and
maintains the compressor being stopped while the temperature detected by the temperature detector is lower than or equal to the second temperature when the driving condition detector detects that the vehicle is stopped.
2. The air conditioning device for a vehicle according to claim 1, wherein
the controller controls the compressor to decrease the temperature detected by the temperature detector to be lower than or equal to the third temperature when the driving condition detector detects that the vehicle is moving in another driving condition other than the coasting operation.

3. The air conditioning device for a vehicle according to claim 1, wherein
the second temperature is higher than 10° C. and lower than 20° C. when the first temperature is higher than or equal to 0° C. and lower than or equal to 10° C., and
the second temperature is higher than 15° C. and lower than 20° C. when the first temperature is higher than or equal to 10° C. and lower than or equal to 15° C.

4. The air conditioning device for a vehicle according to claim 1, wherein
the cold storage portion contains paraffin as a base and is made from a paraffin mixture including at least two kinds of paraffin.

5. The air conditioning device for a vehicle according to claim 1, wherein
the cold storage portion is made from a paraffin mixture including fifteen-carbon paraffin and sixteen-carbon paraffin,
a concentration of the fifteen-carbon paraffin in the paraffin mixture is more than 20 mass percent and less than 50 mass percent, and
a concentration of the sixteen-carbon paraffin in the paraffin mixture is more than 50 mass percent and less than 80 mass percent.

6. The air conditioning device for a vehicle according to claim 1, wherein
the evaporator has more than one of the cold storage portion,
at least one of the cold storage portions has the phase-change energy in the low temperature range, and
at least another one of the cold storage portions has the phase-change energy in the high temperature range.

7. An air conditioning device for a vehicle, comprising:
a compressor that is operated by a power generator of the vehicle, compresses a refrigerant and discharges the refrigerant, and circulates the refrigerant in a refrigeration cycle;
an evaporator that is located on a low pressure side in the refrigeration cycle and cools air for air conditioning by using the refrigerant flowing in the evaporator;
a driving condition detector that detects a driving condition of the vehicle;
a controller that controls a discharge capacity of the compressor;
a cold storage portion that is provided in the evaporator, the cold storage portion being heated by the refrigerant by exchanging heat with the refrigerant;
a temperature detector that detects a temperature of the cold storage portion directly or indirectly, wherein
the cold storage portion has latent heat in a plurality of temperature ranges including at least two different temperature ranges,
one of the two different temperature ranges is a low temperature range from a third temperature to a first temperature,
an other one of the two different temperature ranges is a high temperature range, which is higher than the low temperature range, from the first temperature to a second temperature,
the first temperature, the second temperature, and the third temperature are predetermined temperatures, the second temperature being higher than the first temperature, the third temperature being lower than the first temperature,
the latent heat of the cold storage portion per unit volume or unit weight is greater in the high temperature range than in the low temperature range,
the controller
maintains the compressor being stopped while the temperature detected by the temperature detector is lower than or equal to the first temperature when the driving condition detector detects that the vehicle is in a coasting operation, the coasting operation being a driving condition in which the vehicle is moving at a speed lower than or equal to a specified speed and an acceleration device of the vehicle is not operated and
maintains the compressor being stopped while the temperature detected by the temperature detector is lower than or equal to the second temperature when the driving condition detector detects that the vehicle is stopped.

8. The air conditioning device for a vehicle according to claim 7, wherein
the controller controls the compressor to decrease the temperature detected by the temperature detector to be lower than or equal to the third temperature when the driving condition detector detects that the vehicle is moving in another driving condition other than the coasting operation.

9. The air conditioning device for a vehicle according to claim 7, wherein
the second temperature is higher than 10° C. and lower than 20° C. when the first temperature is higher than or equal to 0° C. and lower than or equal to 10° C., and
the second temperature is higher than 15° C. and lower than 20° C. when the first temperature is higher than or equal to 10° C. and lower than or equal to 15° C.

10. The air conditioning device for a vehicle according to claim 7, wherein
the cold storage portion contains paraffin as a base and is made from a paraffin mixture including at least two kinds of paraffin.

11. The air conditioning device for a vehicle according to claim 7, wherein
the cold storage portion is made from a paraffin mixture including fifteen-carbon paraffin and sixteen-carbon paraffin,
a concentration of the fifteen-carbon paraffin in the paraffin mixture is more than 20 mass percent and less than 50 mass percent, and
a concentration of the sixteen-carbon paraffin in the paraffin mixture is more than 50 mass percent and less than 80 mass percent.

12. The air conditioning device for a vehicle according to claim 7, wherein
the evaporator has more than one of the cold storage portion,
at least one of the cold storage portions has the latent heat in the low temperature range, and
at least another one of the cold storage portions has the latent heat in the high temperature range.

\* \* \* \* \*